Dec. 19, 1961  D. H. SHEPARD ET AL  3,013,719
SERIAL NUMBER CHECKING AND FILLING APPARATUS
Filed Feb. 20, 1957  7 Sheets-Sheet 1

12345
67890

INVENTORS
David H. Shepard and
Pickard F. Bargh
BY Mason, Fenwick & Lawrence
ATTORNEYS

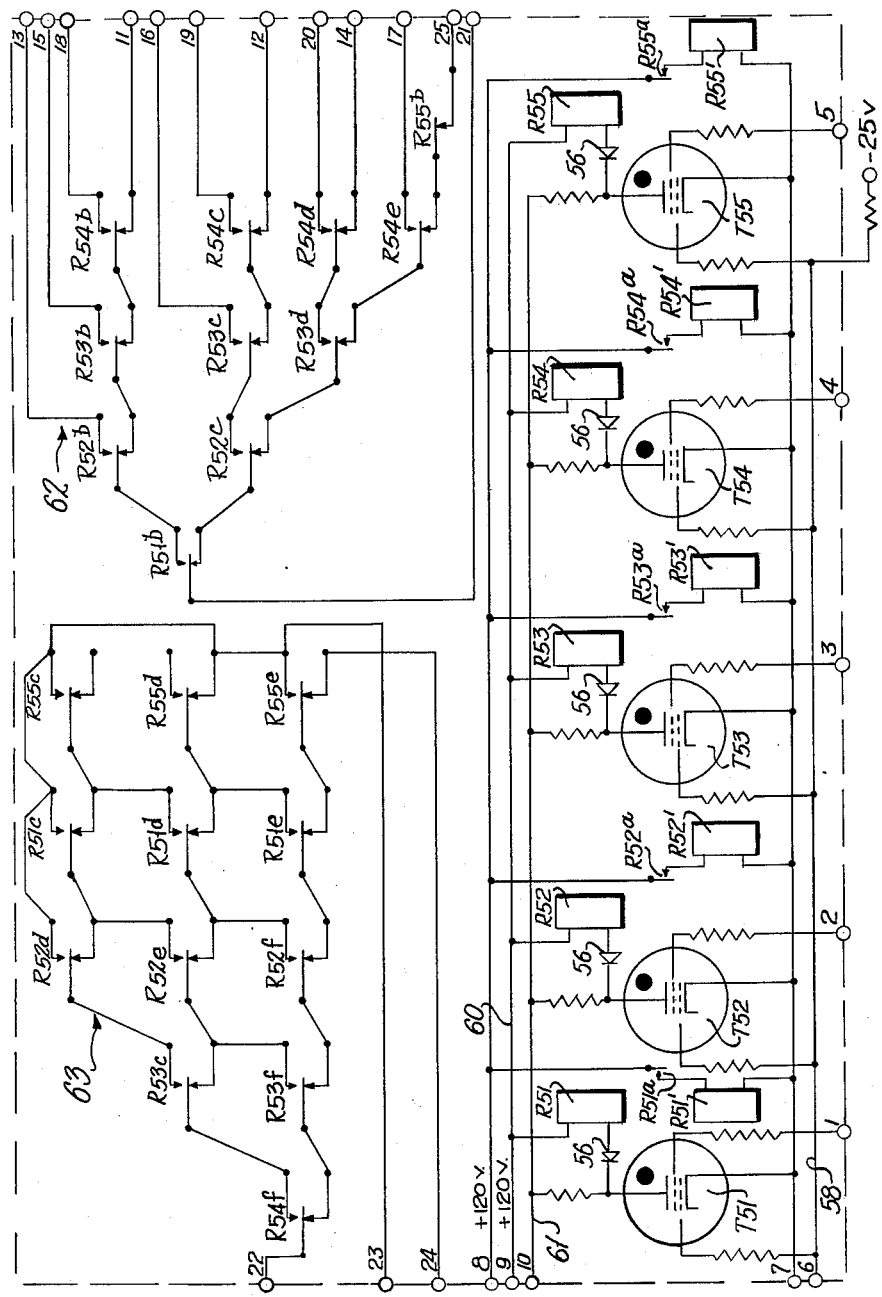

Dec. 19, 1961  D. H. SHEPARD ET AL  3,013,719
SERIAL NUMBER CHECKING AND FILLING APPARATUS
Filed Feb. 20, 1957  7 Sheets-Sheet 7

INVENTORS
David H. Shepard and
Pickard F. Bargh
BY Mason, Fenwick & Lawrence
ATTORNEYS

United States Patent Office 3,013,719
Patented Dec. 19, 1961

3,013,719
SERIAL NUMBER CHECKING AND
FILLING APPARATUS
David H. Shepard, Falls Church, and Pickard F. Bargh, Springfield, Va., assignors to Intelligent Machines Research Corporation, Alexandria, Va., a corporation of Maryland
Filed Feb. 20, 1957, Ser. No. 641,332
15 Claims. (Cl. 235—61.7)

The present invention relates in general to apparatus for accurately recording serial numbers and like data, and more particularly to apparatus for automatically checking the accuracy of the output of automatic character sensing equipment employed to read serial numbers and other character groups and, in appropriate circumstances, filling in a missing number in an incompletely read serial number to provide a correct output record of the serial number read.

Heretofore, automatic character sensing apparatus has been devised for producing electrical output signals identifying characters or numbers sensed by the apparatus. Such automatic character sensing equipment may be briefly described as apparatus which is arranged to scan intelligence-bearing documents or the like containing items of information such as printed characters or numbers, sense the presence and/or absence of portions of each character in reference to other portions of the same character, and produce signals indicative of the presence and absence of such portions of characters within the scanning field, interpret the signals thus produced to identify the character sensed, and produce an output pulse at some desired time on one of a plurality of output leads identifying the character read. Examples of such apparatus are disclosed in U.S. Patent No. 2,663,758 granted December 22, 1953 to David H. Shepard and the copending patent application of David H. Shepard, Serial No. 399,227 filed December 17, 1953 now Patent No. 2,897,481, issued July 28, 1959. While it is possible to achieve a very high degree of accuracy in the reading of serial numbers or alphabetical characters by automatic character sensing apparatus alone, it is frequently desirable where extreme accuracy is required for accounting purposes and the like and where the numbers or characters to be read are subject to deterioration or distortion, to provide for independent checking of the reading of the automatic character sensing apparatus.

It has recently been recognized that the application of automatic character sensing apparatus to automatic accounting systems involving the use of card punch machines can produce marked advances in the accounting field. The demands for reading accuracy in such applications, however, are extreme in view of the automatic processing of the character sensing apparatus outputs in such applications.

A serious problem arises, however, in the application of automatic character sensing apparatus to this field of use, due to the fact that the numbers of characters to be read by the character sensing apparatus are usually subject to a substantial variation in the quality of the character representation, ranging from perfectly formed characters to those in which portions are missing, are faint, or are likely to be altered by smudge or other types of interference. An attempt to read the worst of such material would require an unreasonably expensive and complex character sensing device. One practical approach would be to cause the output portions of the character sensing apparatus to ignore the very small percentage of the material which is particularly difficult to read and may lead to ambiguous or erroneous results. This effects a practical solution so long as the material then read incorrectly is rejected by the apparatus and collected for human processing rather than passed undetected through the character sensing apparatus. This is facilitated by the use of some serial number checking apparatus associated with the character sensing apparatus to detect reading errors by the character sensing apparatus and reject or distinctively identify the material from which the reading errors were made. In the interest of reducing to an absolute minimum the amount of material which must be manually processed, it is desirable that certain classes of reading failure such as the absence of one number from a multidigit serial number may be automatically compensated by the apparatus associated with the character sensing apparatus by incorporating a digit in the output serial number record which corresponds to the unread digit of a serial number so as to automatically complete certain incompletely read serial numbers.

An object of the present invention, therefore, is the provision of novel apparatus for automatically checking the accuracy of a group of serial numbers or characters read by character sensing apparatus and, in selected instances, completing incompletely read serial numbers.

Another object of the present invention is the provision of novel apparatus for checking the accuracy of serial number readings made by character sensing apparatus, calculating the value of a single missing digit in the serial number reading upon absence of one digit from the reading, and incorporating the missing digit in proper relative location in an output record of the serial number.

Another object of the present invention is the provision of novel apparatus for checking serial numbers read by automatic character sensing equipment wherein reading failures are detected before the output of the character sensing equipment is applied to output recording devices and improperly read serial numbers are either corrected or are rendered incapable of actuating the output recording device.

Other objects, advantages and capabilities of the present invention will become apparent from the following detail description, taken in conjunction with the accompanying drawings, illustrating one preferred embodiment of the invention.

In the drawings:
FIGURE 1 is a block diagram indicating the manner of association of a serial number checking and fill unit with character sensing apparatus and card punch apparatus in accordance with one application of the present invention.

FIGURE 2 is a schematic diagram of one of the plurality of column storage units employed in the apparatus of the present invention.

FIGURES 3a, 3b and 3c disposed in a horizontal fashion constitute a block diagram of the serial number checking and fill unit intercoupled with the column storage unit in accordance with the present invention.

General description

Figures 1, 8:
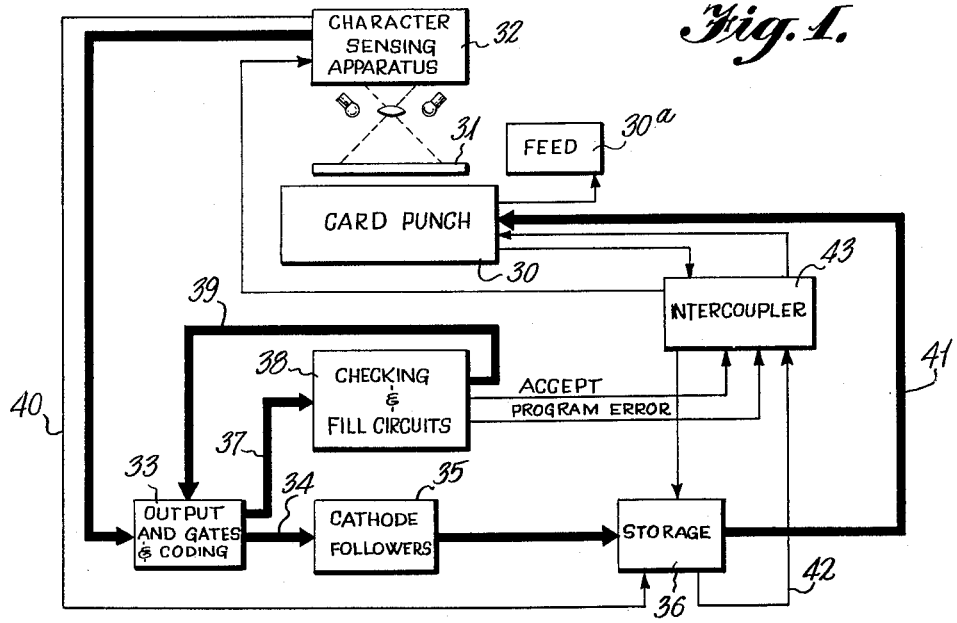
FIGURE 8 illustrates one form of numerical characters which may be used in connection with the present invention.

To facilitate a clearer understanding of the invention, it will be described in a general way as applied to an automatic accounting system, illustrated in FIGURE 1 of the drawings, wherein automatic character sensing equipment is arranged to read an imprinted customer account number from a 51-column tabulating card invoice and a card punch is activated by the character sensing equipment output to punch the account number into the same card. Referring to FIGURE 1, a commercial card punch machine, indicated by the reference character 30, such as the "IBM Card Punch, Type 024" which is described in U.S. Patent No. 2,647,581, and having incorporated therein the usual document feed mechanism, indicated at 30a, serves as the card feed and punch for the 51-column invoice cards. The invoice cards, indicated generally by the reference character 31, are advanced by the said mechanism components 30a of the card punch 30 through the scanning field of automatic character sensing apparatus 32 which may be of the type disclosed in U.S. Patent No. 2,663,758 and No. 2,897,481. Such character sensing apparatus includes a scanner unit which may be of the type disclosed in the copending application of David H. Shepard and Howard W. Silsby, III, Serial No. 579,594 filed April 20, 1956, now Patent No. 2,943,208 to cause optical scanning of the invoice cards along a pair of fixed lines or scanning frames and convert the light impulses resulting from scanning into corresponding electrical impulses. It also generates an electrical timing pulse which indicates the end of each line of scan or scanning frame and which is hereinafter referred to as the Tf timing pulse. The character sensing apparatus also includes video circuits which amplify and shape the scanning and timing signals from the scanner unit. The video circuits may include circuitry of the type disclosed in the said copending application of David H. Shepard and Howard W. Silsby, III, Serial No. 579,594 filed April 20, 1956, to develop control voltages which automatically control the sensitivity of the scanner and timing pulse photocells and which also provide automatic threshold adjustment to optimize discrimination between character signals and noise. The character sensing apparatus 32 also includes an interpreter unit which analyzes the scanner signals from the video circuits and recognizes the characters scanned. The interpreter also includes output AND gates each of which produces an output signal indicative of the character identified upon simultaneous occurrence of selected input conditions which distinctively identify the respective characters in accordance with the program of the character sensing apparatus, the output AND gates being frequently interconnected in such a way as to effect a translation of the identity of the character recognized into a coded representation. However, for convenience of description, the output AND gate and coding unit, indicated by the reference character 33, is detached from the character sensing apparatus 32 in the block diagram of FIGURE 1 and indicated as a separate block. In the preferred embodiment herein illustrated, the output AND gate and coding unit translates the identity of the character recognized into a two-out-of-five storage code.

The coded signals at the output of the unit 33 are sent through lead 34 and cathode followers 35 to a storage unit 36, and uncoded signals and certain control pulses are sent from the output AND gate and coding unit 33 through lead 37 to a checking and fill unit 38.

In the present scheme, each account number to be read by the character sensing apparatus 32 contains an added redundant digit, forming a check digit, which makes the number satisfy the self-checking number scheme of the type disclosed in U.S. Patents Nos. 2,661,896 and 2,731,196. The checking and fill unit 38 includes checking counters which are advanced by each character identity signal on the output leads 37 of the output AND gate and coding unit 33 in accordance with the scheme. Fill control circuits in the checking and fill unit 38 count the characters that are unrecognized, and if only one character is unrecognized, the storage unit 36 is tested to determine the column in the storage unit which is empty because of failure of the character sensing apparatus 32 to recognize the character for that column, and the checking circuit is caused to generate the digit which must be added in the checking counter to satisfy the checking scheme. This digit is sent back to the output AND gate and coding unit 33 through lead 39 with an accompanying indication as to whether the missing digit is from an "odd column" or an "even column," this identification being necessary because of substitutions to be made in the odd column numbers in accordance with the self-checking scheme. The identifying code of the missing character is then stored in the empty storage position of the storage unit 36.

The storage unit 36 serves as a ten-position buffer between the interpreter components of the character sensing apparatus 32 and the card punch 30. Read in to storage is accomplished by coincidence between column signals derived from the interpreter components of the character sensing apparatus 32 through the lead 40 and coded character signals derived from the lead 34 of the output AND gate and coding unit. Read out from storage is coupled through lead 41 to the card punch 30 upon completion of the checking and fill operation in a manner to be later described. The storage unit 36 is also arranged to produce an error signal on lead 42 when a storage error has occurred in the storage unit 36, which signal is applied to the card punch to prevent punching of the invoice card and effect rejection of the card. An intercoupler unit, indicated by the reference character 43, is provided to keep the functions of the character sensing apparatus in step with the card punch 30.

In order for the system of the present invention to accomplish the functions of checking the serial numbers on the documents and filling in an incorrectly read digit in a reliable fashion, it is necessary that the digits imprinted on the document be so designed that it is virtually impossible for smudge or other types of defacing to so change a digit that it will be recognized by the character sensing apparatus as a different digit. It is important for operation of the present system that the characters or digits be so distinct from each other that any likely type of alteration will cause the character sensing apparatus to produce no output rather than to identify the character incorrectly. Operation without such a feature would be extremely risky. The complete absence of any character identifying signal for the particular character which is obscured or not properly recognizable makes it possible for the checking and fill unit 38 to count the sum of the recognizable digits and check digit only and determine the value of the missing digit by calculating the difference between the sum of the digits read and a selected check condition. Also, since the storage position of the storage unit 36 corresponding to the missing character is left vacant, the location of the missing character in the serial number can be readily determined.

*The self-checking type face*

To guard against identification of a smudged or marred digit in the serial number as a different digit, the type face used for the account number is a special self-checking type face which is designed so that any character differs from each of the other nine digits by at least two major strokes. A major stroke may be considered as a portion of the character which is at least as long as one-third the distance from the top to the bottom of the character. An example of a type face which will satisfy these conditions is illustrated in FIGURE 8. The following table illustrates the stroke differences between the characters of this type face of FIGURE 8 which may be relied upon by the interpreter components of the character sensing apparatus to distinguish the characters, wherein an X indicates that the feature must be detected and a 0 indicates that the feature must not be detected:

|  |  | 0 | 1 | 2 | 3 | 4 | 5 | 6 | 7 | 8 | 9 |
|---|---|---|---|---|---|---|---|---|---|---|---|
| (1) | Short vertical, upper right | X | X | X | X | X | 0 | 0 | X | X | X |
| (2) | Short vertical, upper left | X | 0 | 0 | 0 | X | X | X | 0 | X | X |
| (3) | Short vertical, lower right | X | X | 0 | X | X | X | X | X | X | X |
| (4) | Short vertical, lower left | X | 0 | X | 0 | 0 | 0 | X | 0 | X | 0 |
| (5) | Upper horizontal | X | 0 | X | X | 0 | X | X | X | X | X |
| (6) | Middle horizontal | 0 | 0 | X | X | X | X | X | 0 | X | X |
| (7) | Lower horizontal | X | X | X | X | 0 | X | X | 0 | X | 0 |
| (8) | Broken sides | 0 |  |  |  |  |  |  |  | X |  |
| (9) | Middle projecting right |  |  |  |  | X |  |  |  |  | 0 |

It will be apparent from the above tabulation that in most cases at least one stroke must be added and at least one stroke removed in order to transform one character. In these cases, it is obviously impossible to change one character into another by smudge alone. In the remaining cases, at least two strokes must be added or removed to transform the character. The character sensing program of the interpreter utilizes the features of this type face to avoid incorrect identification of a smudge or misformed character.

In the operation of the system illustrated in FIGURE 1, the digits of a ten-digit serial number on each invoice card satisfying the check scheme are scanned by the scanner components of the character sensing apparatus 32 as the cards are fed by the card punch unit 30 and the digits pass the reading stations of the scanner. The scanner pulses are analyzed by the interpreter components of the character sensing apparatus 32, which emit character-identifying signals as each character is recognized. The character identities are stored in the ten-position storage unit 36 entry to which is advanced at the end of each character. If the character cannot be recognized by the interpreter no output signal occurs for that character and its storage position in the storage unit 36 is left vacant.

The character identity signals also cause the checking circuits of the checking and fill unit 38 to simultaneously perform the checking operation so that checking will be completed as soon as the last digit of the serial number has been scanned. If the entire number does not satisfy the checking scheme, the difference which must be added to make the number check is available within the checking circuits. Other portions of the checking circuits count the number of unrecognized characters up to two in order to determine whether an error correction is possible, and if two or more digits are unrecognizable, the invoice card passes through the card punch unpunched.

The account number will be punched into the card by the card punch 30 when ten digits satisfying the checking scheme are recognized or when nine digits are recognized, in the latter case, the missing digit being supplied by the checking and fill unit 38. The card will skip out unpunched and operation will continue when eight or less digits are recognized and will skip out unpunched and operation will be stopped when ten digits are recognized but the check scheme is not satisfied, indicating extreme character alteration or component failure, or when storage check circuits detect an impossible storage code indicating storage circuit failure.

*The column storage units*

As stated before, the storage unit 36 serves as a ten-character buffer between the interpreter and the output AND gate components of the character sensing apparatus and the output punch 30. The characters are stored in a two-out-of-five code. The storage unit 36 in the preferred embodiment consists of ten identical pluggable storage packages illustrated in block diagram form in FIGURES 3a–3c and indicated therein by the reference character 50. The storage unit 36 accepts coded character signals from the interpreter of the character sensing apparatus 32 and stores them under control of a character counter in the interpreter components. Each column storage package 50 is tested during the operation of the check and fill unit to determine whether a valid character is stored therein and storage is read out of the column storage units 50 under control of the output punch 30. It may be read out in serial or parallel, depending on the needs of the punch.

The output from the interpreter components of the character sensing apparatus 32 are coded into a two-out-of-five storage code. The code bits are designed, 1, 2, 4, 7 and 0. The sum of the code bits for any digit except zero is equal to the digit. This is illustrated by the following table:

| | | | | | |
|---|---|---|---|---|---|
| 1 | 1 |   |   |   | 0 |
| 2 |   | 2 |   |   | 0 |
| 3 | 1 | 2 |   |   |   |
| 4 |   |   | 4 |   | 0 |
| 5 | 1 |   | 4 |   |   |
| 6 |   | 2 | 4 |   |   |
| 7 |   |   |   | 7 | 0 |
| 8 | 1 |   |   | 7 |   |
| 9 |   | 2 |   | 7 |   |
| 0 |   |   | 4 | 7 |   |

In connection with the description that follows, it should be borne in mind that most of the units herein described are pluggable units and the accompanying drawings include indications of numerals below the numeral 30 within the block diagram boxes of many of these pluggable units which indicate the pin connections to these units. Therefore, all numbers hereinafter mentioned which are below the numeral 30 refer either to pin connections of such pluggable units or to matters other than reference characters applied to the components in the drawings.

Referring particularly to the schematic diagram of one of the column storage packages 50 illustrated in FIGURE 2, each storage package includes five thyratrons T51–T55, respectively, which may be type 5696 thyratrons, and five double coil relays, the pick-up coils of these relays being designated R51–R55 and the hold coils of these relays being designated R51′–R55′. The pick-up coil R51–R55 of each relay is connected through a diode 56 to the plate circuit of its corresponding thyratron T51–T55 and the hold coil of each relay R51′–R55′ is connected through its own normally open contact R51a–R55a to a hold bus 57 to which plus 120 volts is applied under control of an exterior hold cam contact.

Figure 3A:
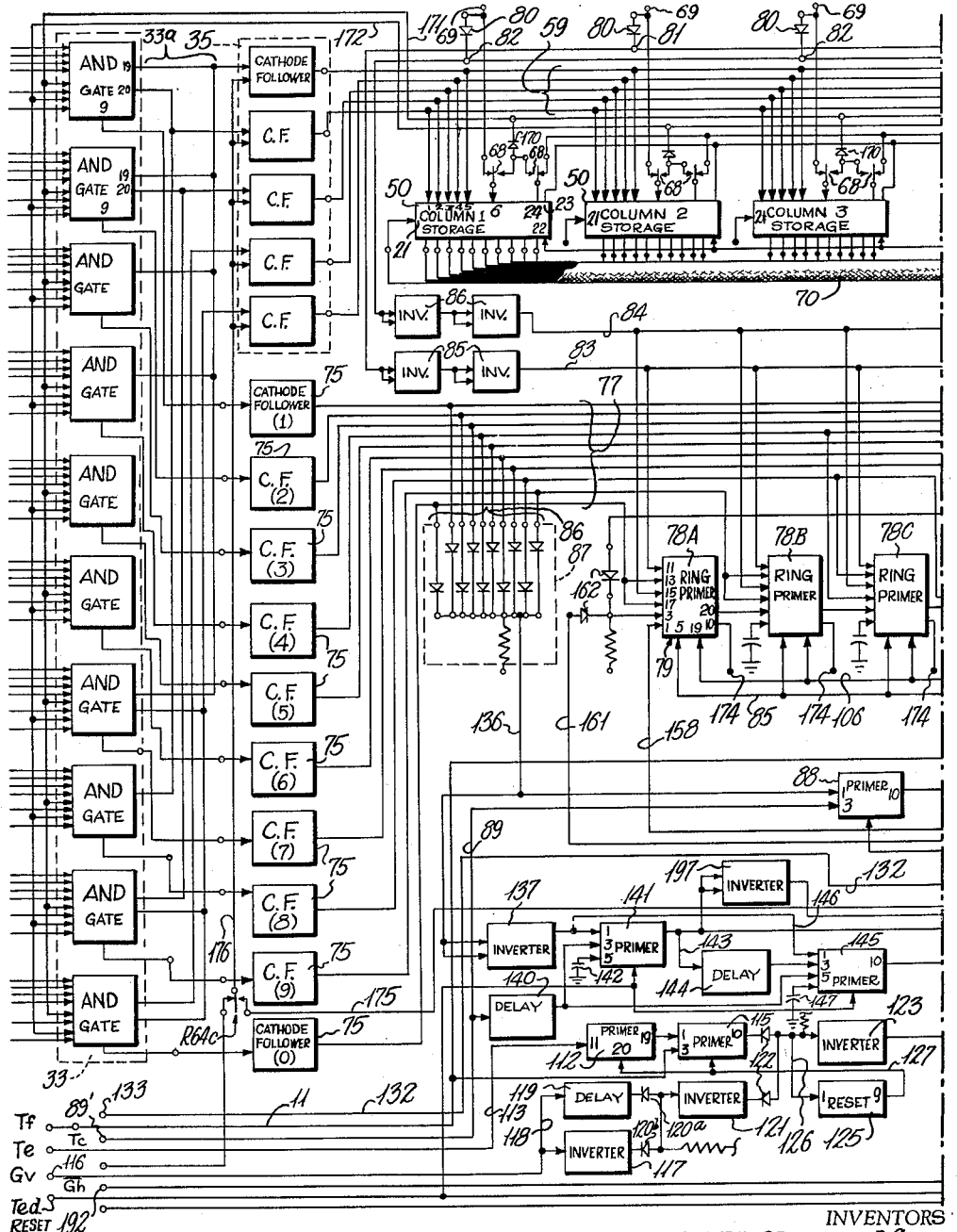
Figure 3B:
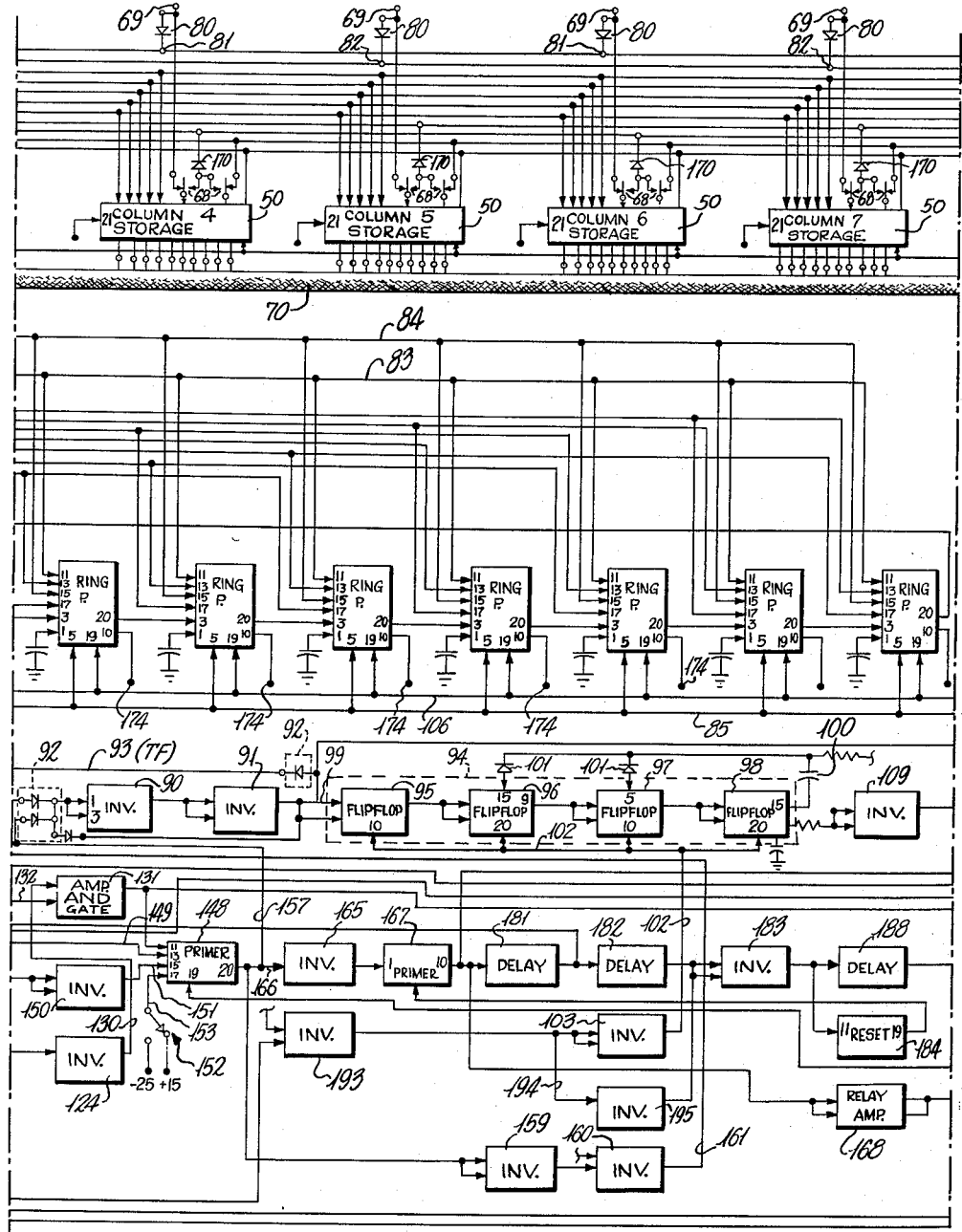
Figure 3C:
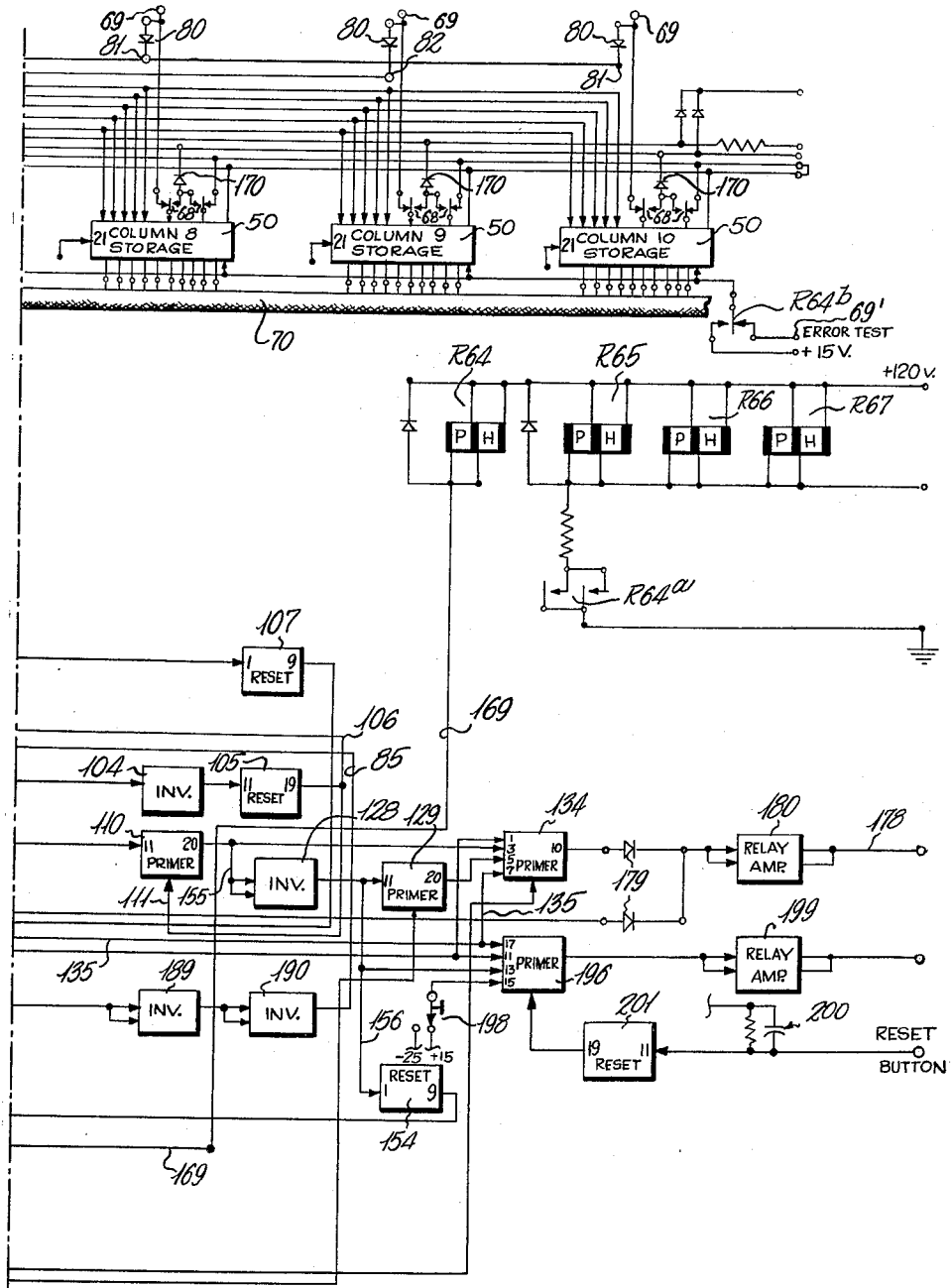

The storage thyratrons T51–T55 are each fired by coincidence between signals on the control and suppressor grids of the thyratrons. The control grids of all of the thyratrons T51–T55 are connected to a column bus 58 which is connected to pin 6 of the pluggable storage package and to which plus 15 volts is applied when a character is to be stored in that column and minus 25 volts is applied at all other times. The suppressor grids of the thyratrons T51–T55 are connected to the code input pins 1–5, respectively, which are bussed to the corresponding code input pins of all of the other column storage packages 50, as is illustrated in FIGURES 3a–3c. Each code bus of the group of code busses, indicated generally by the reference character 59, is driven by a code driver such as the gated cathode followers 35. The arrangement of the cathode followers 35 is such that the code bus will be at about minus five volts when that code bit is to be stored and about minus 35 volts at all other times. The code bits designated 1, 2, 4, 7 and 0 are to be applied to the pins 1, 2, 3, 4, and 5, respectively of each column storage package. When the control grid or any of the thyratrons T51–T55 is at plus 15 volts and the suppressor grid of that tube is at minus 5 volts, the thyratron will fire. One end of each of the relay pick-up coils R51–R55 is connected to the transfer cam bus 60 to which plus 120 volts is applied under control of an external transfer cam during selected time intervals.

When plus 120 volts is applied to this bus 60, those relays R51-R55 whose thyratrons are conducting will pick up. Plus 120 volts is also applied in proper timed relation to the hold bus 57, so that those relays which are thus operated will hold themselves in operation due to the closing of their contacts R51a-R55a until voltage is removed from the bus 57. Plate voltage is also periodically applied and removed from the plate bus 61 by means of an external plate cam contact.

By suitable timing of application of plate voltage on bus 61, transfer bus voltage on bus 60 and hold bus voltage on bus 57, the storage packages 50 may be used as a two-stage storage with read out of relay points occurring while data is being read into the thyratrons. In applications where a single stage storage is needed, plate and transfer busses 61 and 60 are connected together and the hold bus 57 is not used. In this operation, the relays R51-R55 will pick up as soon as the thyratrons fire and will remain operated until the thyratrons are reset.

The storage packages also include a storage tree, indicated by the reference character 62, formed by the relay points of the relays R51-R55, and a validity check tree 63, formed by other relay points of these relays R51-R55.

While the relays R51-R55 are operated, a path will exist through the storage tree 62 of relay points from the column common, pin 21, to level terminals 1-0 at pins 11-20, the level terminals being the terminals at which pulses representing the respective numbers to be read may exit from the storage package. Therefore, a pulse at the column common, pin 21, will emerge at the terminal 11-20, corresponding to the digit stored. Similarly, if pulses are applied to each of the level terminals 11-20 in sequence, a pulse will emerge from the common terminal, pin 21, only when the terminal 11-20 corresponding to the digit stored is being pulsed. Thus the storage package 50 may be used for column-by-column serial read out, level-by-level serial read out or parallel read out.

The relay points forming the validity check tree 63 are relied upon to determine when there are no code bits stored in the storage package or when 1, 3 or more of the relays R51-R55 are picked up. The latter condition indicates a storage error since only two relays should be picked up in each package 50. To accomplish this validity test, test signals are applied to the test input terminal at pin 22. If none of the relays R51-R55 were picked up, the test signal will find a path through the relay points R54f, R53f, R52f, R51e and R55e to the pin 24, indicating that there are no bits stored in the storage package. If 1, 3 or more relays are picked up, the test signal will emerge from the pin 23. If 2, and only 2 relays are picked up, the test pulse will find no outlet. This test relay tree 63 is used in conjunction with the checking and filling functions to determine the empty column storage package by use of the no-bit exit at pin 24.

In the operation of the column storage packages 50 making up the storage unit 36, the output AND gates 33 which combine the character strokes and recognize the character by a concurrence of stroke recognition conditions at their inputs translate their output into a two-out-of-five storage code. The code busses 33a connect the outputs of the output AND gates 33 to the gated cathode followers 35 which will emit code signals only during the end-of-character sample pulse Tc sample, produced in a known fashion by the interpreter components of the character sensing apparatus. Tc sample begins coincident with the beginning of the Tc and terminates shortly before the end of Tc. The character counter components of the interpreter, which successively count the number of characters read by the character sensing apparatus, determine which column storage package 50 receives the character code. To this end, pin 6 of each package 50 is connected through relay points, indicated generally at 68 and controlled by relay coils R64-R67, to terminals 69 to which the character counter signals are applied from the interpreter. The character counter advances at the end of each end-of-character Tc pulse. If one character is not recognized by the interpreter, the storage column corresponding to that character will remain empty and the character counter will advance.

When reading is completed and if one, and only one, character is not recognized so that fill is required, plus 15 volts is connected through relay points R64b to the test input pins of all column storage packages 50 and each pin 24 is connected to the common column pin 6 of each storage package through the relay points, indicated as a group by the reference character 68. The fill relays R64-R67 are double coil relays which are energized under control of the checking and fill unit 38 in a manner to be later described.

If any one of the column storage packages 50 is empty, the application of plus 15 volts to all of the test input pins 22, the interconnection of the pins 24 with the column storage pin 6 will result in plus 15 volts being applied to the thyratron control grids of the empty storage package 50 so that the column will be ready to store the fill digit.

After fill has been completed, or after the end of reading if fill is not required, the pins 22 of the column storage packages 50 are connected to an error digit pulse applied to the terminal 69' from the intercoupler and derived in a conventional manner, and all error output pins 23 and 24 are bussed together.

If other than two bits are stored in any column storage package 50, an error signal will result which will stop operation.

If no error occurs, a stepping switch or like energizing medium in the intercoupler will apply a card punch pulse from a cam to the pin 21 of each of the storage packages 50 in turn. The output leads from the terminals 11-20 of each storage package are bussed together by levels at the cable connector indicated generally by the reference character 70. The card punch pulse applied to each package 50 will emerge from the appropriate digit terminal 11-20 and be applied to the corresponding card punch interposer magnet through the normally open contacts of the dup interrupt relay.

*The number checking and fill unit*

As heretofore stated, the self-checking system makes use of the self-checking number scheme disclosed in U.S. Patents Nos. 2,661,896 and 2,731,196 and is commercially known as the "IBM Self-Checking Number Scheme." This self-checking number scheme makes any number self-checking by appending a redundant checking digit. The checking digit is such that after a simple substitution of the units, hundreds, ten thousandths, and further alternate columns, the sum of the digits will be equal to a multiple of ten. The objects of the scheme is to detect substitution and adjacent column transposition errors. In order to detect transposition errors, it becomes necessary to substitute in alternate columns so that transpositions will fail to satisfy the scheme. The substitution used is the result of multiplying each digit by 2, and adding the resulting digits together when two digits result from the multiplication, as indicated by the following table:

| Original Digit | Multiplied By Two | Substitute Digit |
|---|---|---|
| 0 | 0 | 0 |
| 1 | 2 | 2 |
| 2 | 4 | 4 |
| 3 | 6 | 6 |
| 4 | 8 | 8 |
| 5 | 10 (1+0=) | 1 |
| 6 | 12 (1+2=) | 3 |
| 7 | 14 (1+4=) | 5 |
| 8 | 16 (1+6=) | 7 |
| 9 | 18 (1+8=) | 9 |

The checking digit is appended to the right of the units position. Substitution is always done in the units, hundreds and other alternate positions to the left. The following example shows the application of a checking digit in accordance with this scheme to the number 763 198 024:

| | |
|---|---|
| Original Number | 763 198 024 |
| Substitute Columns | x x  x  x x |
| Substituted Number | 566 198 028 |
| Digit Total | 5+6+6+1+9+8+0+2+8=45 |
| Check Digit | 5 |
| Total Including Check Digit | 50 |
| Self-Check Number | 763 198 024 5 |

If an error of reading occurs, the substitution of one number for another will cause the total to be other than a multiple of ten. Similarly, an adjacent column transposition will disturb the total.

The number checking components of the checking and fill unit 38 consist essentially of means for inserting the substitute digit where required and a single modulus 10 counter. If the counter is reset to zero, the counter will again be on zero after the number is read if all digits have been read correctly. The following examples show how the checking device operates on a correctly read number, and on a substitution error. It should be noted that the counter contains only the last digit of the total. Any multiple of ten will satisfy the checking scheme:

Self Checking Number 763 198 024 5

| Event | Digit Read | Substitute? | Advance Counter | Digit Total | Counter Total |
|---|---|---|---|---|---|
| Reset | | | | | 0 |
| 1st Character | 7 | Yes | 5 | 5 | 5 |
| 2nd Character | 6 | | 6 | 11 | 1 |
| 3rd Character | 3 | Yes | 6 | 17 | 7 |
| 4th Character | 1 | | 1 | 18 | 8 |
| 5th Character | 9 | Yes | 9 | 27 | 7 |
| 6th Character | 8 | | 8 | 35 | 5 |
| 7th Character | 0 | Yes | 10 | 45 | 5 |
| 8th Character | 2 | | 2 | 47 | 7 |
| 9th Character | 4 | Yes | 8 | 55 | 5 |
| 10th Character | 5 | | 5 | 60 | 0 Check |

Self Checking Number 763 198 024 5
Number with Substitute Error 764 198 024 5

| Event | Digit Read | Substitute? | Advance Counter | Counter Total |
|---|---|---|---|---|
| Reset | | | | 0 |
| 1st Character | 7 | Yes | 5 | 5 |
| 2nd Character | 6 | | 6 | 1 |
| 3rd Character | 4 | Yes | 8 | 9 |
| 4th Character | 1 | | 1 | 0 |
| 5th Character | 9 | Yes | 9 | 9 |
| 6th Character | 8 | | 8 | 7 |
| 7th Character | 0 | Yes | 10 | 7 |
| 8th Character | 2 | | 2 | 9 |
| 9th Character | 4 | Yes | 8 | 7 |
| 10th Character | 5 | | 5 | 2 Non Check |

The error checking circuit components of the checking and fill unit 38 operate, in general, on the same broad principle as the apparatus for checking accuracy of automatic character readings disclosed in our copending application Serial No. 564,278, filed February 8, 1956, except that the error checking circuit of the present invention operates on the modulus 10, that is, it completes its counting cycle in ten counts, rather than a modulus of 9. The heart of the error checking circuit is a four-stage binary counter which is arranged to count modulus 10 by feedback circuits. A pulse gate admits end-of-frame timing pulses $Tf$ which form the advance pulses for the counter, to the mod 10 counter and also causes advance of a ten-stage control counting ring. This pulse gate is opened by the occurrence of a character recognition pulse produced at the output of the interpreter components of the character sensing apparatus 32. This same pulse sets the ten-stage control counting ring to the value, or the substitute value, of the digit read. That is to say, when the interpreter yields an output pulse on the lead indicative of recognition of the digit 3, this pulse sets the ten-stage control counting ring in such a manner that the counter will advance through a count equal to the number of $Tf$ pulses corresponding to the value, or the substitute value, of the digit read, that is 3 pulses or 6 pulses, and will then cause the pulse gate to close.

Referring more specifically to the operation of the error checking circuits, the interpreter output AND gates 33 have both coded outputs at the pins 19 and 20, and direct outputs at the pins 9. The direct outputs at the pins 9 are connected to ten digit cathode followers 75. The output AND gates 33 are gated by a pulse of selected duration produced upon detection of the end of each character read and designated the end-of-character or $Tc$ sample pulse. This gating prevents signals produced at the output leads of the output AND gates 33 from reaching the storage busses 59 through the gated cathode followers 35, and also prevents the direct outputs from getting up to the selected upper voltage level of plus 15 volts, except during the occurrence of the $Tc$ sample pulse.

If all pulses to one of the AND gates 33 assigned to a particular character are up at $Tc$ sample time, the corresponding digit cathode follower 75 will raise its digit bus located in the group of digit busses 77. Each of the digit busses 77 is connected to the "odd" input of one ring primer of the group of ten ring primers 78 constituting the ten-stage control counting ring 79, and to the "even" input of another ring primer according to the following table:

| Digit | Odd (Substitute) Input | Even Input |
|---|---|---|
| 1 | 2 | 1 |
| 2 | 4 | 2 |
| 3 | 6 | 3 |
| 4 | 8 | 4 |
| 5 | 1 | 5 |
| 6 | 3 | 6 |
| 7 | 5 | 7 |
| 8 | 7 | 8 |
| 9 | 9 | 9 |
| 0 | 0 | 0 |

Control of the counting ring 79 to determine whether it will begin counting from the digit signalled or at the substitute digit position is effected by combining the character counting signals at terminals 69 through the diodes in a diode unit 80 into two OR gates, as indicated at 81 and 82, the OR gate 81 indicating even storage positions and OR gate 82 indicating odd storage positions. The diode unit 80 is preferably a package containing ten HD2120 diodes with plates and cathodes of each diode brought to separate terminals. The diode plates are preferably connected to terminals 1–10 and the cathodes are connected to terminals 11–20 in reverse order. Each of the gates 81 and 82 is coupled to its primer ring bus 83, 84, respectively through two inverters 85, 86. When the odd gate 82 is up a plus 15 volts, the primer ring 79 will begin counting at the substitute digit position, while if the even gate 81 is up, the ring 79 will count from the digit signalled, this being achieved by the different connections from the primer ring busses 83 and 84 to the ring primers 78 in the manner illustrated in FIGURES 3a–3c.

The inverter stages of the system herein disclosed are preferably of the type having two inputs to the control grid of a triode section, one of the inputs being through a 47 mmf. speed-up capacitor and the other being through a 300K ohm resistor, the arrangement being such that whenever the input is "down" (at minus 25 volts) the tube is cut off and the output is up at plus 15 volts, and whenever the input is up, the tube is conducting and the output is down at minus 25 volts, these voltage levels being determined by appropriate diode connections between the output lead and plus 15 and minus 25-volt sources.

Figure 5:
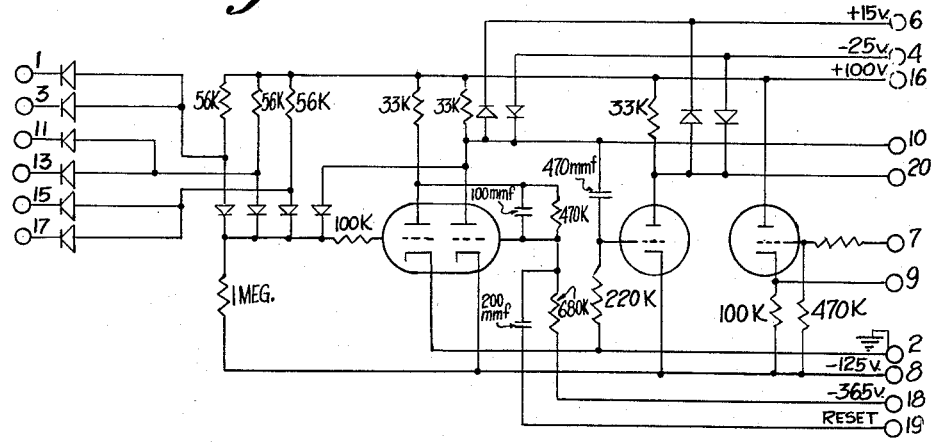
FIGURE 5 is a schematic diagram of one type of ring primer stage which might be used in connection with the present invention.

The ten-stage control counting ring 79 consists of the ten primers 78A–J, an example of the schematic circuit of each being illustrated in FIGURE 5. Reference to FIGURE 5 will disclose that the ring primers 78 are provided with a group of diodes forming three AND gates connected to an OR gate as the input circuit to each primer tube by which the triggering of the primer tube into conduction can be made dependent upon the simultaneous occurrence of a plurality of program events, and the output of the primer is provided with a differentiating inverter. A ring primer 78 may be turned on in three different ways: By coincidence between the substitute digit terminal 13 and the odd column signal on the primer ring bus 84 applied to terminal 11 of the ring primer; the coincidence between the digit signal on one of the digit busses 77 applied to the ring primer terminal 17 and the even column signal on the primer ring bus 83 applied to terminal 15; or the incidence of an advance pulse applied to terminal 3 of the ring primer 78 and derived in a manner to be later described.

When a ring primer 78 has been turned on, it will stay on until reset. When reset, the negative swing of its output terminal will cut off the differentiating inverter causing a short output pulse which forms the advance signal for the next ring primer stage. The capacitor connected to the terminal 1 of each ring primer 78 delays the turn-on long enough to prevent it from coming on while a reset pulse which is applied to all ten stages through the lead 85 is still effective. Without this capacitor, the ring primer 78 might come on, go off because of reset, and come on again, causing a false advance pulse to the next stage.

Figure 4:
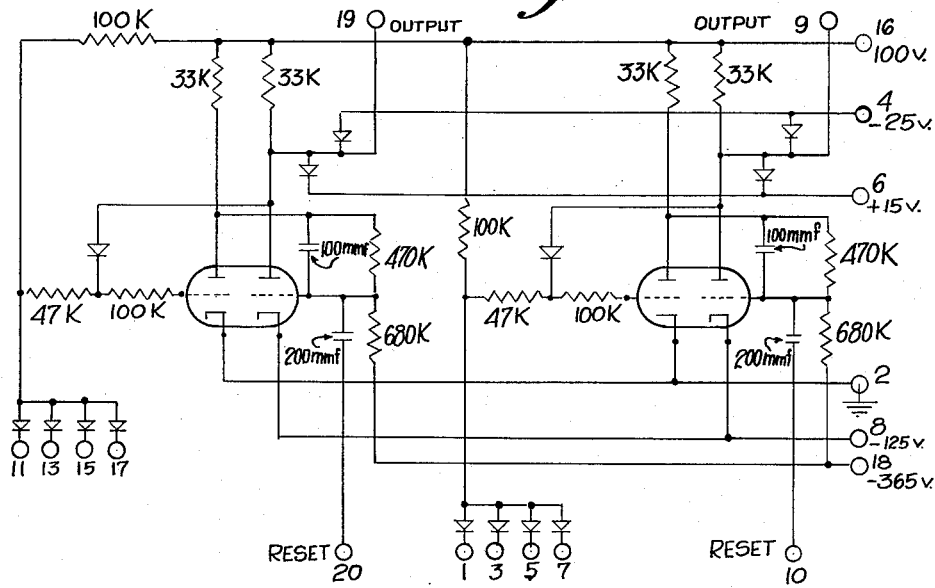
FIGURE 4 is a schematic diagram of one type of primer stage which might be used in conjunction with the present invention.

The ten input signals from the digit cathode followers 75 are coupled by a group of leads 86 through an OR gate 87, formed of a diode unit identical to the diode unit 80 and indicated schematically in FIGURE 3a, to one input on pin 1 of an advance control primer 88. The schematic circuit of the advance control primer 88 and of all other "primers," as distinguished from "ring primers" is illustrated in FIGURE 4 of the drawings. The other input, at pin 3, to the advance control primer 88 is the end-of-character pulse Tc, derived through lead 89 from terminal 89′. Every digit signal which accompanies a Tc pulse will turn on advance control primer 88. The output of the advance control primer 88 at pin 10 is coupled to the double inverters 90 and 91 through an OR gate formed of diodes from the diode unit 92 which is also identical to the diode units 87 and 80. As long as the advance control primer 88 is up (at plus 15 volts), the output of inverter 91 will attempt to be up. However, the end-of-frame signal Tf is coupled to the inverter stage 91 through another diode in the diode unit 92, the Tf signals being applied through the lead 93 to the pin 18 of the diode unit 92. The Tf lead 93 is at minus 25 volts except during the Tf pulse. Consequently, the output of inverter stage 91 will be held at minus 25 volts except during Tf pulses. If on the other hand, the output of the inverter 91 is down, a Tf pulse at diode 92 will be unable to raise the lead 99. Thus, the effect of the inverter 91 and the diode connection through diode unit 92 to the Tf lead 93 to provide Tf pulses on the output lead of the inverter 91 only when the input to the inverter 91 is down. Inverter 91 thus connected acts as a pulse gate. Each pulse out of the inverter 91 causes the ring counter 79 and the scale-of-ten binary counter 94, indicated generally by the reference character 94, to advance one count.

The scale-of-ten binary counter 94 consists of four flip-flop stages 95, 96, 97 and 98 with external feedback to cause it to count scale of ten. Advance pulses, which are the Tf pulses occurring at the output of the inverter 91, are connected through the lead 99 to the input of the first flip-flop stage 95. The normally conducting output at pin 9 of the first flip-flop stage 95 is connected to the inputs of the second flip-flop stage 96. Stage 96 is similarly connected to flip-flop stage 97 and flip-flop stage 97 is similarly connected to stage 98. The normally nonconducting output at pin 15 of flip-flop stage 98 is connected through a differentiating circuit formed of resistor-capacitor network 100 and isolating diodes 101 to the normally nonconducting outputs at pins 15 and 5 of flip-flop stages 96 and 97, respectively. The reset terminals 10 and 20 of each of the stages 95, 96, 97 and 98 are connected in common through the lead 102 to the output of a reset inverter 103.

The binary counter 94 is reset by a negative pulse on the pins 10 and 20. This pulse insures that the normally nonconducting sides of each flip-flop stage 95–98 will be conducting. When an advance pulse is applied through the lead 99 to the binary counter input terminals at pins 1 and 3 of stage 95, the stage 95 will flip on the negative swing of that pulse. When the normally nonconductive side comes out of conduction, the positive rise on its plate is coupled to the second flip-flop stage 96. However, since the flip-flop advances on negative swings only, stage 96 will remain in its reset condition. The negative swing of a second advance pulse on the lead 99 will cause stage 95 to flip again, returning it to its reset condition. The negative swing on its plate will cause stage 96 to set. The positive swing on stage 96 output will reach flip-flop stage 97, but will not affect it. The counter will pass through the following conditions as successive pulses are received:

| Event | F5 | F6 | G5 | G6 | Binary Count |
|---|---|---|---|---|---|
| Reset | 0 | 0 | 0 | 0 | 0 |
| 1st Pulse | X | 0 | 0 | 0 | 1 |
| 2nd Pulse | 0 | X | 0 | 0 | 2 |
| 3rd Pulse | X | X | 0 | 0 | 3 |
| 4th Pulse | 0 | 0 | X | 0 | 4 |
| 5th Pulse | X | 0 | X | 0 | 5 |
| 6th Pulse | 0 | X | X | 0 | 6 |
| 7th Pulse | X | X | X | 0 | 7 |
| 8th Pulse | 0 | 0 | 0 | X | 8 |
| Feedback | 0 | X | X | X | 14 |
| 9th Pulse | X | X | X | X | 15 |
| 10th Pulse | 0 | 0 | 0 | 0 | 0 |
| 11th Pulse | X | 0 | 0 | 0 | 1 |
| 12th Pulse | 0 | X | 0 | 0 | 2 |

From the above tabulation, it will be apparent that the negative swing which occurs on the normally nonconducting plate when stage 98 is set at the 8th pulse is used to advance the counter from 8 to 14, this swing causing stages 96 and 97 to be set. The effect of this advance is to cause the binary counter 94 to complete its counting cycle in ten counts. The tenth count, therefore, causes the binary counter to count from binary 15 to binary 0. When this occurs, there will be a negative swing on the normally conducting plate as it comes into conduction. That swing is used as a signal that the binary counter is passing to the count of 0. Pulses on the pulse gate inverter 91 are also inverted by the inverter 104 and fed to a primer ring reset unit 105. A schematic diagram of the reset unit 105 and other reset units employed in this circuit appears at FIGURE 6 of the drawings. The reset pulse from reset unit 105 occurs at the negative swing of its input pulse, so that each reset will begin at the beginning of each advance gate pulse. The reset pulses produced by the reset unit 105 are coupled through the lead 106 to the pin 19 of each of the ring primers 78 to cause the control counting ring 79 to advance.

When the last ring primer 78J of the ten-stage counting ring 79 is reset, it causes the reset unit 107 to generate a reset pulse which resets the ring advance control primer 88. When the primer 88 is reset, the pulse gate inverter 91 closes the pulse gate in the manner previously described.

Figure 6:
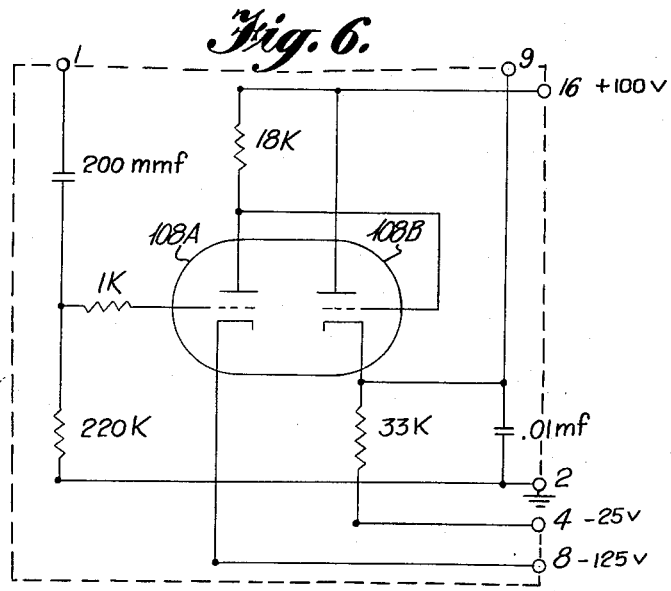
FIGURE 6 is a schematic diagram of one type of reset unit which might be employed in the present invention.
Figure 7:
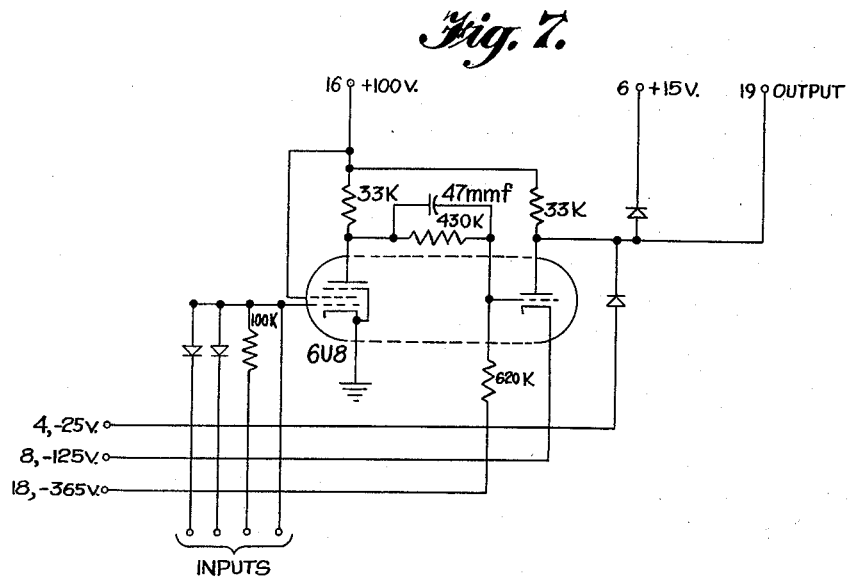
FIGURE 7 is a schematic diagram of one type of delay unit which might be employed in the present invention.

Each of the reset units in this system, such as the reset units 105 and 107, produces a reset pulse which begins at the trailing edge of the input pulse in the following manner: Referring to FIGURE 6 showing a schematic diagram of one of the reset units, normally the grid of the first half 108A of the dual triode reset tube 108 is biased at ground and its cathode is at minus 125 volts. Consequently, the first half 108A of the reset tube will be conducting. The second half 108B by cathode follower action puts the .01 mfd. capacitor at a low voltage. When a positive pulse is applied to the input of the reset unit, its differentiated pulse will try to make the first half 108A conduct harder, but that half is already conducting to saturation. Upon occurrence of the end or trailing edge of the positive input pulse, the negative differentiated pulse will cut off the first half 108A, causing its plate voltage to rise rapidly. The second half 108B will charge the .01 mfd. capacitor rapidly through a swing of about 80 volts. When the differentiated pulse on the grid of the first half 108A subsides, the first half 108A will again conduct to saturation and cut off the second half 108B. The .01 mfd. capacitor will discharge slowly through the 33K cathode resistor. Thus, the reset pulse will begin at the negative going edge of the input pulse, and will rise sharply to its peak value and have an exponential decay.

Referring again to the binary counter stages 95–98 illustrated in FIGURES 3a–3c, each time that the binary counter passes to the count of zero, indicating that ten counts have been received, a negative swing will occur at the pin 17 of the flip-flop stage 98. This swing produces a differentiated output pulse at the output of inverter 109, which differentiated output pulse sets the primer 110. The primer 110 is reset by the ring primer advance reset signal from reset unit 105, which is applied to the primer 110 through the lead 111 branching from the reset output lead 106. The primer 110 will come on every time the binary counter goes to zero, but will be reset on the next advance of that counter by the reset signal produced by the reset unit 105. Thus, primer 110 will be on only while the binary counter is on zero. If primer 110 is on after all ten digits of the document serial number have been read, this condition will indicate that the checking scheme has been satisfied.

In order to perform the fill operation which is described hereafter, it is necessary to produce a pulse derived from detection of the end of the reading field which is properly timed with respect to the end-of-frame $Tf$ pulses. The "end of the reading field" is meant the end of the period during which the interpreter of the character sensing apparatus is gated to receive signals from one document, it being understood that the interpreter is gated on for a selected period while a document is passing through the reading field of the scanner and is gated off until the next document passes into the scanner reading field. An end-of-reading-field pulse, designated $Te$, is produced at the end of the reading field and may be derived in a conventional manner by a conventional relay in response to sensing of a selected level of the card punch program card. Since there is no set relation between the time of occurrence of end-of-frame $Tf$ pulses and end-of-reading-field $Te$ pulses, a group of timing circuits are used to provide a $Te'$ pulse in correct timed relation. The primer 112 is coupled through lead 113 to a terminal to which the end-of-field pulses $Te$ are applied. $Tf$ pulses supplied through the lead 114 and the output pulses of primer 112 responsive to the $Te$ pulse are combined in primer 115. Primer 115 will come on at the first $Tf$ pulse after primer 112 has come on. Thus, primer 115 will come on at the first $Tf$ pulse after the $Te$ pulse.

A vertical gate signal, designated $Gv$, is produced in a conventional manner in the interpreter of the character sensing apparatus, to rise to plus 15 volts a fixed time after a $Tf$ pulse occurs and remain on until the next $Tf$ pulse. This vertical gate signal $Gv$ is employed in the character sensing apparatus to gate out from selected circuits certain unwanted signals which may occur during the short interval immediately following the occurrence of each $Tf$ pulse. This vertical gate signal $Gv$ derived from the terminal 116 is inverted by the inverter 117 and is also applied directly through lead 118 to the delay unit 119. The inverter $Gv$ signal and the delayed $Gv$ signal are combined in an OR gate formed by the diodes 120a and 120b coupled to the input of inverter 121. The output of the inverter 121 is a pulse which begins at the beginning of the $Gv$ signal and whose duration is determined by the delay interval of the delay unit 119.

The pulse from the inverter 121 is combined in an external AND gate formed by the diodes 122 with the output of primer 115. The next pulse to occur at the output of the inverter 121 after the primer 115 comes on will pass through the AND gate 122. This pulse, which is designated $Te'$, is inverted twice by inverters 123 and 124 and is used as the timed end-of-reading-field signal $Te'$ for the checking and fill circuits. A reset unit 125 similar to the reset units 105 and 107 receives the signal from the AND gate 122 through the lead 126 and causes a reset pulse which is applied through lead 127 to reset primers 112 and 115. Thus, only one $Te'$ pulse is gated through for each $Te$ pulse.

The output of primer 110, which is the counter-on-zero primer, is inverted by inverter 128 and is used to trigger a primer 129. Primer 129 will stay on until reset by an end-of-character reset pulse, designated $Tcd$, which is generated in typical fashion in the interpreter unit of the character sensing equipment a selected delay interval following occurrence of the end-of-character pulse $Tc$. The primer 129 provides an indication that the binary counter 94 has been off zero during the character. Since the binary counter 94 must go through at least one count for each character, a zero causing ten counts, the binary counter 94 must be off zero during the counting of the last character if the whole number checks.

It is also necessary, as previously described, to condition the operation of the fill circuit upon the scanning of ten characters. The interpreter unit is typically provided with counting means, which may be responsive to end-of-character $Tc$ pulses, to condition a primer in the interpreter to be up when ten characters have been scanned. The output of the inverter 124, which is the timed end-of-reading-field pulse $Te'$, is applied through lead 130 to the input of the amplifying AND gate 131, and produces a standard plus 15 volt output as long as predetermined AND requirements are satisfied. This $Te'$ signal is combined at the input of primer unit 131 with the signal from the primer in the interpreter which says that ten characters have been scanned, which signal is applied through lead 132 from terminal 133. Accordingly, primer unit 131 will be up during the $Te'$ pulse if ten characters were seen by the scanning unit.

An accept primer 134 is conditioned to come on to indicate that the number read checks. The conditions for check are (1) Ten characters seen at end-of-character time $Te$, as indicated by the primer unit 131 being on, (2) binary counter 94 standing on zero, which is indicated by the primer 110 being on, (3) binary counter 94 has been off zero during the last character, as indicated by primer 129 being on, and (4) the occurrence of no failures, as indicated by the signal on lead 135 being up. This conditioning of accept primer 134 is effected by applying the outputs from primers 131, 110 and 129 and the lead 135 to the inputs to the diodes forming the internal input AND gate of the accept primer 134, as shown, for example, in the schematic diagram in FIGURE 4.

The fill operation

In the event that one and only one of the digits in a number on the document is unrecognized by the interpreter, the identity of that number may be recovered from the checking circuits.

The following example will indicate in a general way the manner in which the identity of the unrecognized number may be recovered. If the self-checking number 763 198 024 5 is read and the second digit, 6, is not recognized, the missing digit will be found by counting the number of pulses required to advance the binary counter 94 to zero, as indicated in the following tabulation:

| Event | Digit Read | Substitute | Advance Counter | Counter Total |
|---|---|---|---|---|
| Reset | | | | 0 |
| 1st Character | 7 | Yes | 5 | 5 |
| 2nd Character | | | 0 | 5 |
| 3rd Character | 3 | Yes | 6 | 1 |
| 4th Character | 1 | | 1 | 2 |
| 5th Character | 9 | Yes | 9 | 1 |
| 6th Character | 8 | | 8 | 9 |
| 7th Character | 0 | Yes | 10 | 9 |
| 8th Character | 2 | | 2 | 1 |
| 9th Character | 4 | Yes | 8 | 9 |
| 10th Character | 5 | | 5 | 4 |
| Pulses to Advance Counter to Zero | | | 6 | 0 |

In the above case, the missing number is found by advancing the binary counter 94 until it stands on zero and counting the number of advance pulses, which are the T$f$ pulses, required to advance the binary counter to zero. This procedure can be followed whenever the number missed is from a non-substitute column. When a number from a substitute column is unrecognized, the substitution process must be reversed, as indicated in the following example:

```
Original Number 763 198 024 5
Read As         76_ 198 024 5
```

| Event | Digit Read | Substitute | Advance Counter | Counter Total |
|---|---|---|---|---|
| Reset | | | | 0 |
| 1st Character | 7 | Yes | 5 | 5 |
| 2nd Character | 6 | | 6 | 1 |
| 3rd Character | | Yes | 0 | 1 |
| 4th Character | 1 | | 1 | 2 |
| 5th Character | 9 | Yes | 9 | 1 |
| 6th Character | 8 | | 8 | 9 |
| 7th Character | 0 | Yes | 10 | 9 |
| 8th Character | 2 | | 2 | 1 |
| 9th Character | 4 | Yes | 8 | 9 |
| 10th Character | 5 | | 5 | 4 |
| Pulses to Advance Counter to Zero | | | 6 | 0 |

In this latter case, six counts were required to advance the binary counter 94 to zero, but the number which was unrecognized was a 3. 6 is the substitute digit for 3. Where the missing digit occurs in a substitute column, the process of filling in the missing digit then consists of advancing the binary counter 94 until it stands on zero, counting the number of pulses required to advance the binary counter to zero, and storing the number whose substitute is equal to that number of pulses, in accordance with the rule of substitution described in connection with the checking scheme.

Before the fill operation may be begun, it is necessary to determine whether one and only one character is unrecognized. The digit failures are detected by comparing digit pulses from the OR gate 87 with end-of-character T$c$ sample pulses. Unmatched T$c$ sample pulses are counted. To accomplish this, the digit pulses from the OR gate 87 are applied through the lead 136 to the inverter 137 and inverted. Inverter 137 will be up (plus 15 volts) except during the occurrence of the digit pulses. The T$c$ sample pulse derived from the character sensing apparatus interpreter is applied from the terminal 89' through lead 89 to delay unit 140. The leading edge of T$c$ sample pulse is delayed by the delay unit 140 and the output of the delay unit 140 and of the inverter 137 are combined at the input of primer 141. The delay provided by delay unit 140 insures that the OR gate 87 will have had opportunity to get up to plus 15 volts and the inverter 137 will have gotten down to minus 25 volts. If a digit pulse does occur, inverter 137 will be down by the time the pulse at the output of delay unit 140 begins. If no digit is read by the interpreter, then inverter 137 will be up to plus 15 volts during T$c$ sample time and primer 141 will come on, indicating one failure. The 470 mmf capacitor 142 on the third input to the primer 141 prevents it from being turned on by very short pulses which may occur at the beginning or end of T$c$ sample while inverter 137 is coming up or down. The output of primer 141 is applied through lead 143 to delay unit 144 long enough to allow the T$c$ sample pulse which turned on primer 141 to subside. The output of delay unit 144 is applied to one input of primer 145. When delay unit 144 comes on, it enables the primer 145 to detect a second failure in the same fashion that primer 141 detected a first failure, that is, the output of inverter 137 denoting the occurrence of digit pulses from the OR gate 87 is applied through the lead 146 to one input of primer 145, the delayed T$c$ pulses at the output of delay unit 140 are applied to another input of the primer 145 and the fourth input of the primer 145 is provided with a 470 mmf. capacitor 147 serving the same purposes as the capacitor 142. The primer 141 is, therefore, a first failure primer and the primer 145 is a second failure primer.

The fill decision is made by the primer 148. The coming on of primer 131 in response to occurrence of the timed end-of-reading field signal T$e'$ and indication of ten characters seen by interpreter (signalled on lead 132) forms the first input condition for the fill decision primer 148. Detection of the first failure by primer 141 is the second input condition for the fill decision primer 148, this signal being coupled to pin 13 through lead 149. The absence of detection of a second failure by primer 145 is the third input condition for fill decision primer 148. Detection of this latter condition is accomplished by applying the output of the second failure primer 145 to inverter 150 and coupling the output of inverter 150 through lead 151 to another input terminal (pin 15) of the fill decision primer 148. A manual fill switch, indicated at 152, connects the fourth input lead 153 to fill decision primer 148 to plus 15 volts if the fill switch is manually adjusted to permit fill calculation. The fill switch is manually adjusted to connect lead 153 to minus 25 volts if fill is not to be permitted. With the fill switch 152 on, that is connected to plus 15 volts, the fill decision primer 148 will come on when one and not two failures have been detected, ten characters have been seen, and the end of the reading field has occurred. The fill decision primer 148 will stay on until it is reset by reset unit 154. Reset unit 154 puts out a reset pulse every time primer 110 comes on, to indicate that the binary counter 94 is on zero. Thus, fill decision primer 148, will be on from the time that the conditions for fill have been recognized until the fill operation has advanced the binary counter 94 to zero. At this time, the counter-on-zero primer 110 will turn off inverter 128 connected to its output through lead 155 and cause reset unit 154 which is connected to inverter 128 through lead 156 to develop a reset pulse which turns off primer 148 and terminates fill calculation.

In the operation of the fill circuit components to effect the fill calculation, the output of the fill decision primer 148 reaches the inverter 90 through diode OR gate unit 92 through the lead 157. In view of the fact that the OR gate unit 92 will allow T$f$ pulses to pass therethrough to the inverters 90 and 91 and binary counter 94 either when the ring advance control primer 88 whose output is applied to pin 1 of OR gate 92 is up, or when fill decision primer 148 whose output is applied through lead 157 to pin 2 of OR gate 92 is up, the turning on of primer 148 allows the T$f$ pulses to reach the binary counter 94. Lead 157 from the fill decision primer 148 also has an extension lead 158 which applies the signal from the output of the primer 148 to the zero ring primer 78A to form one input to the zero ring primer 78A. The other input to the zero ring primer 78A is derived from the output of fill decision primer 148 through the inverters 159 and 160. When fill decision primer 148 comes on, inverter 159 goes off, causing inverter 160 to produce a differentiated pulse which is coupled to the advance input at pin 3 of the zero ring primer 78A through lead 161 and one of a pair of OR gate diodes 162. This latter pulse sets the zero ring primer 78A.

It is important that the zero ring primer 78A be set on zero before the counting ring 79 attempts to advance. It is for this reason that the end-of-character pulse T*e* is retimed to form pulse T*e'* which must occur between T*f* pulses. Since the T*e'* is one of the inputs to fill decision primer 148 through primer 131, turning on of primer 148 must come between T*f* pulses. Accordingly, the zero ring primer 78A will be set before the counting ring 79 begins to advance.

Reset pulses derived from rest unit 105 are applied through the lead 106 to each of the ring primers 78. When the zero ring primer 78A is advanced in response to the output derived directly and indirectly from the fill decision primer 148 through leads 158 and 161 to input pins 1 and 3 of the zero ring primer 78, the counting ring 79 will advance until the binary counter 94 goes to zero. The number of advance pulses required to accomplish this will depend upon the content of the binary counter 94 just prior to thte beginning of fill. For example, if the binary counter 94 is standing on 3, 7 advance pulses will be required to bring the binary counter to zero. Since the zero ring primer 78A is on at the beginning of fill, 7 pulses will leave primer 78H turned on. If the binary counter 94 is on zero, ten pulses will be required to cause the binary counter 94 to go to zero. In this connection, it should be noted that the fill decision primer 148 is not reset until the binary counter 94 goes to zero. Under this condition, it becomes necessary to "close" the counting ring 79 so that it will advance from zero, ring primer 78A, around to zero again. This is accomplished by bringing the output of the last ring primer 78J through one of the diodes of the OR gate 162 to the advance input at pin 3 of the zero primer 78A. This advance input will be operative only when the fill decision primer 148 is on.

Whatever the condition of the binary counter 94 when fill begins, it will be on zero when the fill calculation is completed. The ring primer 78A-78J left on will indicate the number of pulses which were needed to bring the binary counter 94 to zero. This number or its equivalent, as determined by the substitute table, will be the missing digit. In order to insert the missing digit into the proper column storage package 50, it is necessary to determine which column is empty and whether this column is odd or even. This is accomplished by the fill relays R64–R67, illustrated in FIGURE 3c. The inverter 165 is connected to the output of fill decision primer 148 through lead 166. Inverter 165 puts out a positive pulse to turn on primer 167 when the fill decision primer 148 is reset at the completion of fill calculation. This primer 167 causes a relay amplifier 168 to pick up fill relay R64 through lead 169. Reference to FIGURE 3c will show that picking up of relay R64 in turn picks up fill relays R65, R66 and R67 through fill relay points R64a. The picking up of fill relay R64 also shifts fill relay contact R64b to transfer the test input at pin 22 of all storage packages 50 to plus 15 volts. The picking up of fill relays R64–R67 also effects transfer of the "no bits stored" output at pin 24 of each storage package 50 to connect with the column common (pin 6) of that storage package, through the relay contacts 68, 69 of the fill relays. This causes the column bus (pin 6) of the empty storage package 50 to be brought to plus 15 volts so that the missing digit may be stored in that column.

The "no bits stored" output (pin 24) of all even column packages 50 are also joined together through an OR gate, and the no bits stored output of all odd columns are joined together through a similar OR gate, the diodes forming these two OR gates being generally indicated by the reference character 170. The empty column signal will raise either the odd fill bus 171 or even fill bus 172 which are in turn connected to the odd and even inputs of the interpreter output AND gates 33.

At this point in the operation, the counting ring 79 contains the results of the fill calculation. Each primer ring stage 78A-78J is connected through terminals indicated generally at 174 to the even fill input of one output AND gate 33 and to the odd fill input of another output AND gate 33. When the fill column test is made, the even or odd bus 172, 171 will determine which output AND gate 33 will attempt to rise. A transfer point R64c of the fill relay R64 connects the fill sample pulse on lead 175 to the sample bus 176 of the coding cathode followers 35. When the fill relay primer 167 comes on to pick up the fill relay R64, it also picks up an accept relay through lead 178, diode OR gate 179 and relay amplifier 180. The rise of the output of fill relay primer 167 is delayed by a delay unit 181. Once up, the output of delay unit 181 will stay up until primer 167 is reset. The output of delay unit 181 is the fill sample which is applied along the lead 175 to gate the coding cathode followers 35 and allow the fill digit to be stored.

The rise of the output of delay unit 181 is delayed by the delay unit 182 and inverted by inverter 183. When delay unit 181 comes on, inverter 183 goes down to initiate a reset pulse from reset unit 184. This resets the fill relay primer 167 to terminate the fill sample and drop out the fill relays.

The accept relay amplifier 180 can receive signals from either the accept primer 134 or the fill relay primer 167. When either of these primers is up, its signal will reach relay amplifier 180 through the diode OR gate 179 and cause it to pick up the accept relay. The accept relay must be up in order for the card punch 30 to be activated to punch the card. Thus, only those cards for which the number checks or can be filled will be punched. All other cards are passed by the card punch 30 unpunched.

When primer 167 is reset, inverter 183 will go up. A short interval later, the delay unit 188 will go up. The output of delay unit 188 is doubly inverted by inverters 189 and 190. Inverter 190 will be down during the same interval that delay unit 188 is down. Inverter 190 is connected to the "clear reset input" to all ten ring primers 78A-78J through lead 85. Thus, when inverter 190 is down, all ring primers 78A-78J will be reset.

The binary counter 94 is reset just prior to the beginning of the reading field. The inverse of a gating signal produced by the program card or suitable contacts in the punch or the like to gate the interpreter on during the interval the document is passing through the scanning field, is fed from terminal 192 to a differentiating inverter 193. Inverter 193 produces a short positive pulse at the beginning of the reading field. The positive pulse at the output of the inverter 193 is inverted by inverter 103. The negative pulse produced at the output of inverter 103 is applied through lead 102 to reset all four stages of the binary counter 94.

The positive pulse from inverter 193 is also coupled through lead 194 and inverted by inverter 195. The negative output pulse produced by inverted 195 causes an additional reset pulse from reset unit 184 to insure that fill relay primer 167 is reset.

A program error primer 196 is arranged to come on when inverter 197, primer unit 131 and inverter 128 are on together. This signifies that there have been no failures, ten characters were seen at T*e'* and the counter is not on zero. The second section of the fill switch, indicated by reference character 198, keeps the error primer 196 from coming on when fill is disabled by transferring the fourth input of the primer 196 from plus 15 to minus .25 volts.

When the primer 196 comes on, it causes relay amplifier 199 to pick up an error stop relay which may be located in the card punch 30 to stop the operation of the card punch feed 30a. The program error primer 196 is manually reset by pressing a reset button accessible to the operator. This button grounds the RC network 200 at the input of reset unit 201. The resulting negative going swing of reset network 200 causes reset unit 201 to emit a reset pulse which resets program error primer 196.

If desired, the storage may be tested for errors after the reading field is finished and the fill completed. To accomplish this, the test input pins 22 of all storage packages 50 are connected to ground so that the error busses at pins 23 and 24 will be grounded if other than two code bits are stored in any column. This is achieved by suitable relay contacts. In such an arrangement, the ground error bus will pick up the error stop relay described in the preceding paragraph to interrupt operation.

When the output device is a card punch such as type 024 card punch 30, the intercoupler 43 is arranged to properly integrate the character sensing apparatus, the checking and fill circuits, and the storage unit with the card punch and contains all of the additional circuits necessary to use the card punch in combination with the character sensing equipment. Accordingly, it may be designed to perform an assortment of functions. It may receive signals from the card punch which tell it when a card is registered, when the end of character sensing field is reached, when the punch out field is reached, when the end of the punch out field is reached, and when to feed a new card. The character sensing equipment is arranged when reading has stopped, to signal whether the document is accepted, whether it will be filled, and whether a storage or program error has been detected.

From these various signals, the intercoupler may provide a reading gate which admits scanner signals to the interpreter and sends an error test signal and column read out signal to the storage unit 36. It is preferably arranged, as was previously stated, to reset the thyratrons T51–T55 of the storage packages at the end of each card. Preferably, in integrating the circuits with the card punch, the intercoupler sends a dup signal to the card punch if the card is accepted; if not, it sends a skip signal and may energize a reject signal light or the like. If an error is detected, the intercoupler may be arranged to interrupt the automatic feed pulse in the card punch so that operation of the card punch stops at the end of that card cycle and lights an error lamp.

While only one preferred embodiment of the invention has been particularly shown and described, it is apparent that various modifications may be made in the invention without departing from the spirit and scope thereof, and it is desired, therefore, that only such limitations shall be placed thereon as are imposed by the prior art and are set forth in the appended claims.

We claim:

1. Apparatus for checking the accuracy of readings by automatic character sensing apparatus and the like of a multicharacter group of characters having assigned values wherein the sum of the assigned values of the characters comprising said group equals an integral multiple of a selected numeric modulus and selectively completing incompletely read groups of characters, comprising means responsive to character identifying signals derived from said character sensing apparatus to assume distinguishable conditions in accordance with the assigned values of the characters identified by said signals, means for applying said character identifying signals to said conditionable means, calculating means for calculating the character value of the departure of the sum of the values of the identified characters of a character group from a preselected condition of said conditionable means following receipt of said signals, output storage means for recording the values of the characters identified in accordance with their relative location in the group read, and means responsive to the absence of the identifying signals for one character, but not more than one character, in the signals received for any of said character groups for activating said calculating means to fill the calculated character value in said output storage means at a location relative to the record of said identified characters corresponding to the location of an unidentified character in the group read.

2. Apparatus for checking the accurary of readings by automatic character sensing apparatus of a number comprising a number of digits wherein the sum of the values of some of the digits and substitute values of the other digits equals an integral multiple of a selected numeric modulus, calculating the value of digits missing from character sensing apparatus output representations of the number, and filling the missing digits in an output record of the number, comprising counting means for advancing through a counting cycle equal to said modulus, means for advancing said counting means through counts equal to the values and substitute values of the digits constituting the output representation of said number, storage means for storing a record of the digits constituting said output representation in accordance with the relative locations of the digits in the number being read, means for calculating the digit value of the departure of said counting means from a preselected count following advancement of the counting means in response to the output representation, means responsive to the failure of said character sensing apparatus to recognize one digit, but not more than one digit, of said number for activating said calculating means, and means for applying to said storage means the digit value calculated by said calculating means at the proper position of the unrecognized digit in the number.

3. Apparatus for checking the accuracy of readings by automatic character sensing apparatus of a number having a number of digits wherein the sum of the values of some of the digits and substitute values of the other digits equals an integral multiple of a selected numeric modulus, calculating the value of digits missing from the character sensing apparatus output representation of the number, and filling the missing digits in an output record of the number, comprising counting means for advancing through a counting cycle equal to said modulus whereby the counting means will stand on a count of zero when the number has been read correctly, means for advancing said counting means through counts equal to the values and substitute values of the digits constituting the output representation produced by the character sensing apparatus, storage means comprising a plurality of storage columns for storing a record of digits read by said character sensing apparatus, means for storing a record of each digit read in the storage column representative of the relative location of the digit in the number being read, means responsive to the failure of said character sensing apparatus to recognize one digit, but not more than one digit, of the number being read for calculating the digit value of the difference between the count on which said counting means stands following counting of said output representation and the count of zero, and means for applying to the storage package representative of the unrecognized digit in said number the digit value calculated by said calculating means.

4. Apparatus for checking the accuracy of readings by automatic character sensing apparatus of a number having a preselected number of digits wherein the sum of the values of some of the digits and the substitute values of the other digits equals an integral multiple of a selected numeric modulus, calculating the value of digits missing from the character sensing apparatus output representation of the number, and filling the missing digits in an output record of the number, comprising counting means for advancing through a counting cycle equal to said modulus whereby the counting means will stand on a count of zero when the number has been read correctly, means for advancing said counting means through counts equal to the values and substitute values of the digits constituting the output representation produced by the character sensing apparatus, storage means comprising a plurality of storage columns for storing a record of digits read by said character sensing apparatus, means for storing a record of each digit read in the storage column representative of the relative location of the digit in the number being read, means responsive to the failure of said character sensing apparatus to recognize one digit, but not more than one digit, of the number being read for calculating the digit value of the difference between the count on which said counting means stands following counting of said output representation and the count of zero, means for testing the storage condition of said storage packages for detecting the storage package having no digit record stored therein, and means for recording in the vacant storage package the digit value calculated by said calculating means.

5. In combination with character sensing apparatus of the type producing output signal pulses each distinctively identified with one of the digits read thereby, apparatus for checking the accuracy of readings by said automatic character sensing apparatus of a multidigit number wherein the sum of values of alternate digits and the substitute values of intervening digits comprising said number equals an integral multiple of a selected numeric modulus, calculating the value or substitute value of digits of said number unidentified by output signal pulses of said character sensing apparatus, and filling such unidentified digits in an output record of the number, comprising counter means for advancing in response to electrical pulses through a pulse counting cycle equal to said modulus, a source of advancing pulses for said counter means, gating means for controlling the admission of said advancing pulses to said counter means, means for opening said gating means to admit said advancing pulses in response to occurrence of said output signal pulses, a gate control counting ring for counting a number of said advancing pulses equal to the numeric values and substitute values of the digits identified by said input signals and closing said gating means upon completion of said count, storage means including a plurality of storage packages for storing the values of the digits identified by said output signal pulses in relative positions corresponding to the positions of the digits in said number, means responsive to the absence of one digit, but not more than one digit, from the storage digit record of the number for activating said gate control ring counter to assume a condition representative of the digit value of the difference between the count condition of said counter means following counting of the values of the output signal pulses and a count of zero, and means for storing in the storage package of said storage means representative of the location of the unidentified digit in said number the digit value established by said ring counter.

6. Apparatus for checking the accuracy of readings by automatic character sensing apparatus of a number comprising a number of digits wherein the sum of the values of some of the digits and substitute values of the other digits equals an integral multiple of a selected numeric modulus, calculating the value of digits missing from character sensing apparatus output representations of the number, and filling the missing digits in an output record of the number, comprising counting means for advancing through a counting cycle equal to said modulus, means for advancing said counting means through counts equal to the values and substitute values of the digits constituting the output representation of said number, storage means for storing a record of the digits constituting said output representation in accordance with the relative locations of the digits in the number being read, means for calculating the departure value of the difference between the count on which said counting means stands following counting of said output representation and the count of zero, means responsive to the failure of said character sensing apparatus to recognize one digit, but not more than one digit, of said number for activating said calculating means, translating means for deriving from the departure value calculated by said calculating means the digit value of the unrecognized digit, and means for applying to said storage means the digit value of the unrecognized digit at the proper position of the unrecognized digit in the number.

7. Apparatus for checking the accuracy of readings by automatic character sensing apparatus and the like of a multicharacter group of characters and for selectively completing incompletely read groups of characters, wherein at least one character in the group is so selected that the value of a preselected checking function which is a function of each character in the group is equal to a preselected checking value, comprising means responsive to character identifying signals derived from said character sensing apparatus to assume distinguishable conditions in accordance with the identity of the characters identified by said signals, means for applying said character identifying signals to said conditionable means, checking function calculating means responsive to said character identifying signals for calculating the value of said checking function in response to the characters identified, output storage means for recording the identities of the characters identified in accordance with their relative location in the group read, departure value calculating means responsive to said checking function calculating means for calculating the value of the departure of said checking function value from said checking value following receipt of said identifying signals, inverse checking function calculating means responsive to said departure value calculating means for calculating the identity of an unidentified character from said departure value, and means responsive to the absence of the identifying signals for one character, but not more than one character, in the signals received for any of said character groups for activating said departure value calculating means to calculate said departure value, and for activating said inverse checking function calculating means to calculate the character identity from said departure value for causing the identity of the calculated character to be recorded in said output storage means at a location relative to the record of the identified characters of the group corresponding to the location of the unidentified character.

8. Apparatus for checking the accuracy of readings by automatic character sensing apparatus and the like of a multicharacter group of characters and for selectively completing incompletely read groups of characters, wherein at least one character in the group is so selected that the value of a preselected checking function which is a function of each character in the group is equal to a preselected checking value, comprising means responsive to character identifying signals derived from said character sensing apparatus to assume distinguishable conditions in accordance with the identity of the characters identified by said signals, means for applying said character identifying signals to said conditionable means, checking function calculating means responsive to said character identifying signals for calculating the value of said checking function in response to the characters identified, output storage means for recording the identities of the characters identified in accordance with their relative location in the group read, departure value calculating means responsive to said checking function calculating means for calculating the value of the departure of said checking function value from said checking value following receipt of said identifying signals, inverse checking function calculating means responsive to said departure value calculating means for calculating the identity of an unidentified character from said departure value, fill control means responsive to the absence of the identifying signals for one character, but not more than one character, in the signals received for any of said character groups including means for activating said deparure value calculating means to calculate said departure value and means for activating said inverse checking function calculating means to calculate the character identity from said departure value and means for causing the character identity to be filled in said output storage means at the proper location of the unidentified character in the character group read, and accept signal generating means responsive to said checking function calculating means and said fill control means for generating an accept signal whenever said checking function value is equal to said checking value and whenever identified signals have been absent for one, but not more than one, character, in the signals received for any of said character groups.

9. Apparatus for checking the accuracy of readings by automatic character sensing apparatus and the like of a multicharacter group of characters and for selectively completing incompletely read groups of characters, wherein at least one character in the group is so selected that the value of a preselected checking function which is a function of each character in the group is equal to a preselected checking value and wherein the nominal configuration of each character in said multicharacter group is one of a preselected set of character configurations each of which differs from all other configurations in the set by at least two distinguishing features, comprising means responsive to character identifying signals derived from said character sensing apparatus to assume distinguishable conditions in accordance with the identity of the characters identified by said signals, means for applying said character identifying signals to said conditionable means, checking function calculating means responsive to said character identifying signals for calculating the value of said checking function in response to the characters identified, output storage means for recording the identities of the characters identified in accordance with their relative location in the group read, departure value calculating means responsive to said checking function calculating means for calculating the value of the departure of said checking function value from said checking value following receipt of said identifying signals, inverse checking function calculating means responsive to said departure value calculating means for calculating the identity of an unidentified character from said departure value, and means responsive to the absence of the identifying signals for one character, but not more than one character, in the signals received for any of said character groups for activating said departure value calculating means to calculate said departure value, and for activating said inverse checking function calculating means to calculate the character identity from said departure value for causing the identity of the calculated character to be recorded in said output storage means at a location relative to the record of the identified characters of the group corresponding to the location of the unidentified character.

10. Apparatus for checking the accuracy of readings by automatic character sensing apparatus and the like of a multicharacter group of characters and for selectively completing incompletely read groups of characters, wherein at least one character in the group is so selected that the value of a preselected checking function which is a function of each character in the group is equal to a preselected checking value and wherein the nominal configuration of each character in said multicharacter group is one of a preselected set of character configurations each of which differs from all other configurations in the set by at least two distinguishing features, comprising means responsive to character identifying signals derived from said character sensing apparatus to assume distinguishable conditions in accordance with the identity of the characters identified by said signals, means for applying said character identifying signals to said conditionable means, checking function calculating means responsive to said character identifying signals for calculating the value of said checking function in response to the characters identified, output storage means for recording the identities of the characters identified in accordance with their relative location in the group read, departure value calculating means responsive to said checking function calculating means for calculating the value of the departure of said checking function value from said checking value following receipt of said identifying signals, inverse checking function calculating means responsive to said departure value calculating means for calculating the identity of an unidentified character from said departure value, fill control means responsive to the absence of the identifying signals for one character, but not more than one character, in the signals received for any of said character groups including means for activating said departure value calculating means to calculate said departure value and means for activating said inverse checking function calculating means to calculate the character identity from said departure value and means for causing the character identity to be filled in said output storage means at the proper location of the unidentified character in the character group read, and accept signal generating means responsive to said checking function calculating means and said fill control means for generating an accept signal whenever said checking function value is equal to said checking value and identifying signals have been received for each character in the group and for generating an accept signal whenever identifying signals have been absent for one, but not more than one, character in the signals received for any of said character groups.

11. In apparatus for checking the accuracy of readings by automatic character sensing apparatus and the like of a multicharacter group of characters and for selectively completing incompletely read groups of characters wherein the nominal configuration of each character in said multicharacter group is one of a preselected set of character configurations each of which differs from all other configurations in the set by at least two distinguishing features and wherein at least one character in the group is so selected that the value of a preselected checking function which is a function of each character in the group is equal to a preselected checking value, and wherein the character sensing apparatus emits character identifying signals only when combinations of distinguishing features characteristic of one of said preselected set of character configurations have been sensed, the combination comprising storage means responsive to the character identifying signals derived from character sensing apparatus for storing the identity of the identified characters in relative storage positions corresponding to the positions of said characters in the character group and including means responsive to the absence of identifying signals for a character to leave vacant the relative storage position corresponding to the position of the unidentified character in the character group, checking function calculating means responsive to said character identifying signals for calculating the value of said checking function in response to the characters identified, departure value calculating means responsive to said checking function calculating means for calculating the value of the departure of said checking function value from said checking value following receipt of said identifying signals, inverse checking function calculating means responsive to said departure value calculating means for calculating the identity of an unidentified character from said departure value, and fill control means responsive to the absence of the identifying signals for one character, but not more than one character, in the signals received for any of said character groups for activating said departure value calculating means to calculate said departure value and for activating said inverse checking function calculating means to calculate said character identity and for causing said calculated character identity to be stored in said vacant storage position.

12. In apparatus for checking the accuracy of readings by automatic character sensing apparatus and the like of a multicharacter group of characters and for selectively completing incompletely read groups of characters wherein the nominal configuration of each character in said multicharacter group is one of a preselected set of character configurations each of which differs from all other configurations in the set by at least two distinguishing features and wherein each of the characters have assigned values such that the sum of the assigned values of the characters comprising each said group equals an integral multiple of a selected numeric modulus, and wherein the character sensing apparatus emits character identifying signals only when combinations of distinguishing features characteristic of one of said preselected set of character configurations have been sensed, the combination comprising storage means responsive to said character identifying signals for storing the identity of the identified characters in relative storage positions corresponding to the positions of said characters in the character group and responsive to the absence of identifying signals for a character to leave vacant the relative storage position corresponding to the position of said unidentified character in the character group, checking function calculating means responsive to said character identifying signals for calculating the sum of the assigned values of the characters identified by the character identifying signals, departure value calculating means responsive to said checking function calculating means for calculating the value of the departure of the sum of the values of the identified characters of a character group from a preselected checking value following receipt of the character identifying signals, inverse checking function calculating means responsive to said departure value calculating means for calculating the identity of an unidentified character from said departure value, and fill control means responsive to the absence of the identifying signals for one character, but not more than one character, in the signals received for any of said character groups including means for activating said calculating means to calculate said departure value and means for activating said inverse checking function calculating means to calculate the character identity from said departure value and means for causing the calculated character identity to be stored in the vacant storage position of said storage means.

13. In apparatus for checking the accuracy of readings by automatic character sensing apparatus of a multidigit number and for selectively completing incompletely read numbers wherein the nominal configuration of each digit in said multidigit number is one of a preselected set of digit configurations each of which differs from all other configurations in the set by at least two distinguishing features and wherein the sum of the values of alternate digits and substitute values of intervening digits equals an integral multiple of a selected numeric modulus, and wherein the character sensing apparatus emits digit identifying signals only when combinations of distinguishing features characteristic of one of said preselected set of digit configurations have been sensed, the combination comprising storage means responsive to said digit identifying signals for storing the values of the identified digits in relative storage positions corresponding to the positions of said digits in the multidigit number and including means responsive to the absence of identifying signals for a digit to leave vacant the relative storage position corresponding to the position of the unidentified digit in the multidigit number, translating means for translating the values of said intervening digits to substitute values, checking value calculating means for calculating the sum of the values of alternate digits and the substitute values of intervening digits in response to the digit identifying signals emitted upon reading of a multidigit number, departure value calculating means responsive to said checking value calculating means for calculating the value of the departure of the sum calculated by said checking value calculating means from a preselected reference checking value following receipt of said identifying signals, inverse value calculating means responsive to said departure value calculating means for calculating the identity of an unidentified digit from said departure value, and fill control means responsive to the absence of the identifying signals for one digit, but not more than one digit, in the signals received for any of said multidigit numbers for activating said departure value calculating means to calculate said departure value and for activating said inverse calculating means to calculate said digit identity and for causing said calculated digit identity to be stored in the vacant storage position.

14. Apparatus for checking the accuracy of readings by automatic character sensing apparatus and the like of a multi-character group of characters having assigned values wherein the sum of the assigned values of the characters comprising said group equals an integral multiple of a selected numeric modulus and selectively completing incompletely read groups of characters, comprising means responsive to character identifying signals derived from said character sensing apparatus to assume distinguishable conditions in accordance with the assigned values of the characters identified by said signals, means for applying said character identifying signals to said conditionable means, calculating means for calculating the character value of the departure of the sum of the values of the identified characters of a character group from a preselected condition of said conditionable means following receipt of said signals, output storage means responsive either to said character identifying signals for recording the value of the characters identified in accordance with their location in the group read or to said calculating means for recording a calculated character value at a location relative to the record of said identified characters corresponding to the location of an unidentified character in the group read, and means responsive to the absence of the identifying signals for one character, but not more than one character, in the signals received from any of said character groups for activating said calculating means to fill the calculated character value in said output storage means at the location corresponding to the location of the unidentified character.

15. Apparatus for checking the accuracy of readings by automatic character sensing apparatus and the like of a multi-character group of characters and for selectively completing incompletely read groups of characters, wherein at least one character in the group is so selected that the value of a preselected checking function which is a function of each character in the group is equal to a preselected checking value, comprising means responsive to character identifying signals derived from said character sensing apparatus to assume distinguishable conditions in accordance with the identity of the characters identified by said signals, means for applying said character identifying signals to said conditionable means, checking function calculating means responsive to said character identifying signals for calculating the value of said checking function in response to the characters identified, departure value calculating means responsive to said checking function calculating means for calculating the value of the departure of said checking function value from said checking value following receipt of said identifying signals, inverse checking function calculating means responsive to said departure value calculating means for calculating the identity of an unidentified character from said departure value, output storage means responsive either to said character identifying signals for recording the values of the characters identified in accordance with their location in the group read or to said inverse checking function calculating means for recording a calculated character identity at a location relative to the record of said identified characters corresponding to the location of an unidentified character in the group read, fill control means responsive to the absence of the identifying signals for one character, but not more than one character, in the signals received for any of said character groups including means for activating said departure value calculating means to calculate said departure value and means for activating said inverse checking function calculating means to calculate the character identity from said departure value and means for causing the character identity to be filled in said output storage means at the proper location of the unidentified character in the character group read, and accept signal generating means responsive to said checking function calculating means and said fill control means for generating an accept signal whenever said checking function value is equal to said checking value and whenever identified signals have been absent for one, but not more than one, character in the signals received for any of said character groups.

References Cited in the file of this patent

UNITED STATES PATENTS

Re. 23,601     Hamming et al.  ---------- Dec. 23, 1952